G. C. STARKE.
HAY CURING RACK.
APPLICATION FILED AUG. 28, 1912.

1,059,780.

Patented Apr. 22, 1913.

Inventor
George C. Starke.

Witnesses
William Smith

By Victor J. Evans
Attorney

UNITED STATES PATENT OFFICE.

GEORGE C. STARKE, OF AUBURN MILLS, VIRGINIA.

HAY-CURING RACK.

1,059,780.  Specification of Letters Patent.  Patented Apr. 22, 1913.

Application filed August 28, 1912. Serial No. 717,565.

*To all whom it may concern:*

Be it known that I, GEORGE C. STARKE, a citizen of the United States, residing at Auburn Mills, in the county of Hanover and State of Virginia, have invented new and useful Improvements in Hay-Curing Racks, of which the following is a specification.

The invention relates to hay racks, and more particularly to the class of folding hay curing racks.

The primary object of the invention is the provision of a rack of this character on which hay may be shocked whereby a circulation of air will freely pass through the hay and thereby prevent heating, sweating, molding or otherwise damage.

Another object of the invention is the provision of a rack of this character in which the same employs a plurality of sections swingingly connected to each other so that when the rack is not in use the same may be readily and easily folded whereby it may be stored in the least possible space or may be conveniently transported.

A still further object of the invention is the provision of a rack of this character which is simple in construction, strong, durable, thoroughly reliable and efficient in its purpose, and inexpensive in manufacture.

With these and other objects in view the invention consists in the construction, combination and arrangement of parts as will be hereinafter more fully described, illustrated in the accompanying drawings, and pointed out in the claims hereunto appended.

Figure 1:
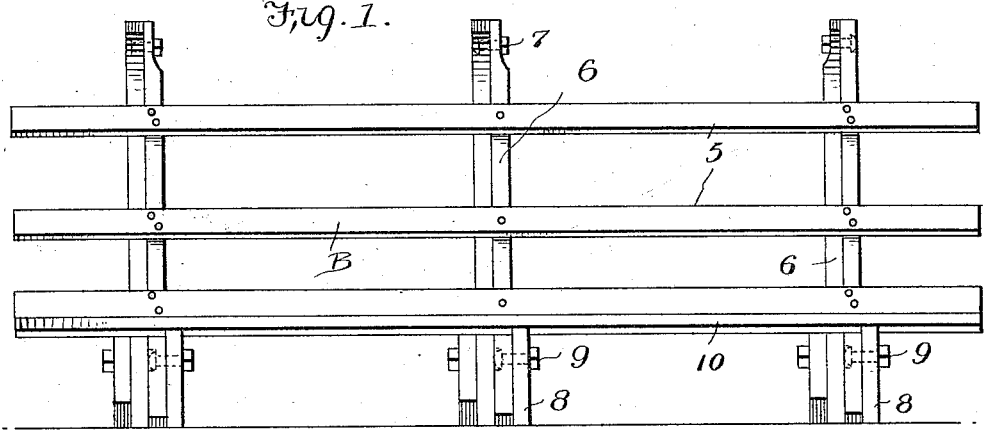
Figure 2:
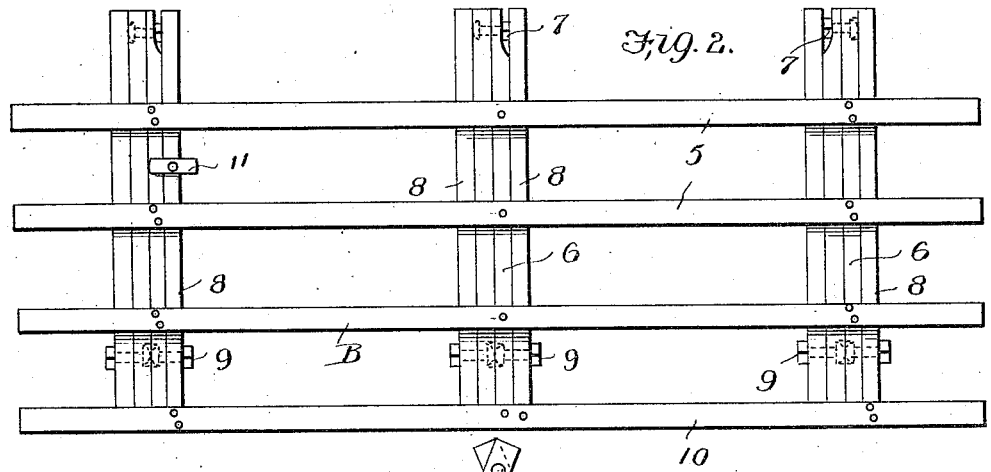
Figure 3:
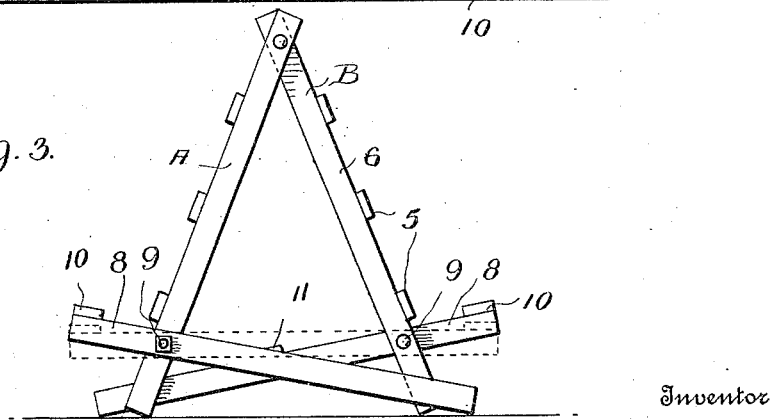

In the drawings:—Figure 1 is a top plan view of the rack constructed in accordance with the invention the same being shown set up. Fig. 2 is a plan view of the rack when folded. Fig. 3 is an end elevation of the rack when in the position shown in Fig. 1, and by dotted lines the rests are shown in the position when sustaining a load.

Similar reference characters indicate corresponding parts throughout the several views in the drawings.

Referring to the drawings by numerals the hay rack comprises a pair of swinging side sections A and B respectively each including spaced longitudinal strips 5 suitably fixed to props or uprights 6 the same being disposed in spaced relation to each other. The uprights of both side sections at their upper ends are hinged together by means of bolt members 7 whereby the side sections may be swung toward and away from each other and on the setting up of the rack the uprights 6 are arranged in upwardly converging relation to each other so that their lower ends will rest upon the ground as shown in Fig. 2 of the drawing. It is, of course, understood that the longitudinal strips 5 may be of any desirable length thereby increasing the load capacity of the rack.

Connected with the uprights 6 and projecting beyond the side sections A and B are bearing flanges or rests, each comprising a plurality of cross rails 8, the same being swingingly connected to the uprights 6 by means of bolt members 9, and fixed to these rails 8 at the outer ends thereof are rest strips 10 the same being coextensive with the longitudinal strips 5 of the side sections, the inner ends of the rails 8 being designed to contact with the lower edges of the longitudinal strips 5 of the side sections A and B when the rack has been loaded with material such as hay, the side bearing flanges or rests are designed to prevent the falling of the hay from the rack and also obviate the building up of the hay from the ground, or that is to say, preventing the hay from contacting or resting upon the ground when loaded upon the rack.

It will be obvious that a free circulation of air will be permitted through the rack so as to cause the proper drying out of the hay or other material on the rack in the shortest possible time, and also prevent the possibility of the hay becoming injured in any manner during inclement weather.

On each outermost rail 8 is mounted a turning knob or block 11 which is adapted to lock with the uprights 6 adjacent thereto when the rest flanges and the side sections have been folded in parallel relation to each other, thereby sustaining the rack in its folded compact relation so it may be readily and easily transported from one point to another or stored in the least possible space when not in use.

From the foregoing it is thought that the construction, and operation of the device will be clearly understood and therefore a more extended explanation has been omitted.

What is claimed is:—

1. A rack of the class described comprising a pair of side sections having uprights pivotally connected at their adjacent ends to permit the folding of the side sections, and rest flanges pivotally connected to the uprights and projecting outwardly and inwardly beyond the side sections whereby on the loading of the side sections the rail flanges will prevent the dropping of the material from the said section for contact with the ground.

2. A rack of the class described comprising a pair of side sections having uprights pivotally connected at their adjacent ends to permit the folding of the side sections, rest flanges pivotally connected to the uprights and projecting outwardly and inwardly beyond the side sections whereby on the loading of the side sections the rail flanges will prevent the dropping of the material from the said section for contact with the ground, and means on the rest flanges and engageable with the uprights for sustaining the flanges and side sections folded.

In testimony whereof I affix my signature in presence of two witnesses.

GEORGE C. STARKE.

Witnesses:
CHAS. STEBBINS, Jr.,
J. A. BROWN.

Copies of this patent may be obtained for five cents each, by addressing the "Commissioner of Patents, Washington, D. C."